United States Patent [19]
Brandt et al.

[11] Patent Number: 6,003,110
[45] Date of Patent: Dec. 14, 1999

[54] METHOD AND APPARATUS FOR CONVERTING MEMORY ADDRESSES INTO MEMORY SELECTION SIGNALS

[75] Inventors: Ulrich Brandt; Norbert Kropsch, both of Munich, Germany

[73] Assignee: Siemens Aktiengesellschaft, Munich, Germany

[21] Appl. No.: 08/774,459

[22] Filed: Dec. 30, 1996

[30] Foreign Application Priority Data

Dec. 29, 1995 [DE] Germany .................. 195 49 061

[51] Int. Cl.$^6$ .................................................. G06F 12/00
[52] U.S. Cl. .................. 711/5; 711/100; 711/157; 711/170; 711/171; 711/172
[58] Field of Search .................. 711/5, 106, 170, 711/100, 157, 172, 171; 395/284

[56] References Cited

U.S. PATENT DOCUMENTS

| | | |
|---|---|---|
| 4,908,789 | 3/1990 | Blokkum et al. .................. 711/172 |
| 5,119,486 | 6/1992 | Albonesi .................. 711/172 |
| 5,446,860 | 8/1995 | Dresser et al. .................. 711/100 |
| 5,539,912 | 7/1996 | Clarke, Jr. et al. .................. 395/284 |
| 5,668,974 | 9/1997 | Grassi et al. .................. 711/157 |

FOREIGN PATENT DOCUMENTS 0 557 566 B1  9/1993  European Pat. Off. .

*Primary Examiner*—Frank J. Asta
*Assistant Examiner*—Nasser Moazzami
*Attorney, Agent, or Firm*—Hill & Simpson

[57] ABSTRACT

A method and system for converting memory addresses into memory selection signals wherein memory modules are inserted into insertion regions of a memory and logical capacity and configuration information is derived from the number and type of modules inserted into the memory. The logical capacity and configuration information is used to generate memory selection signals which optimize the use of the overall memory.

11 Claims, 5 Drawing Sheets

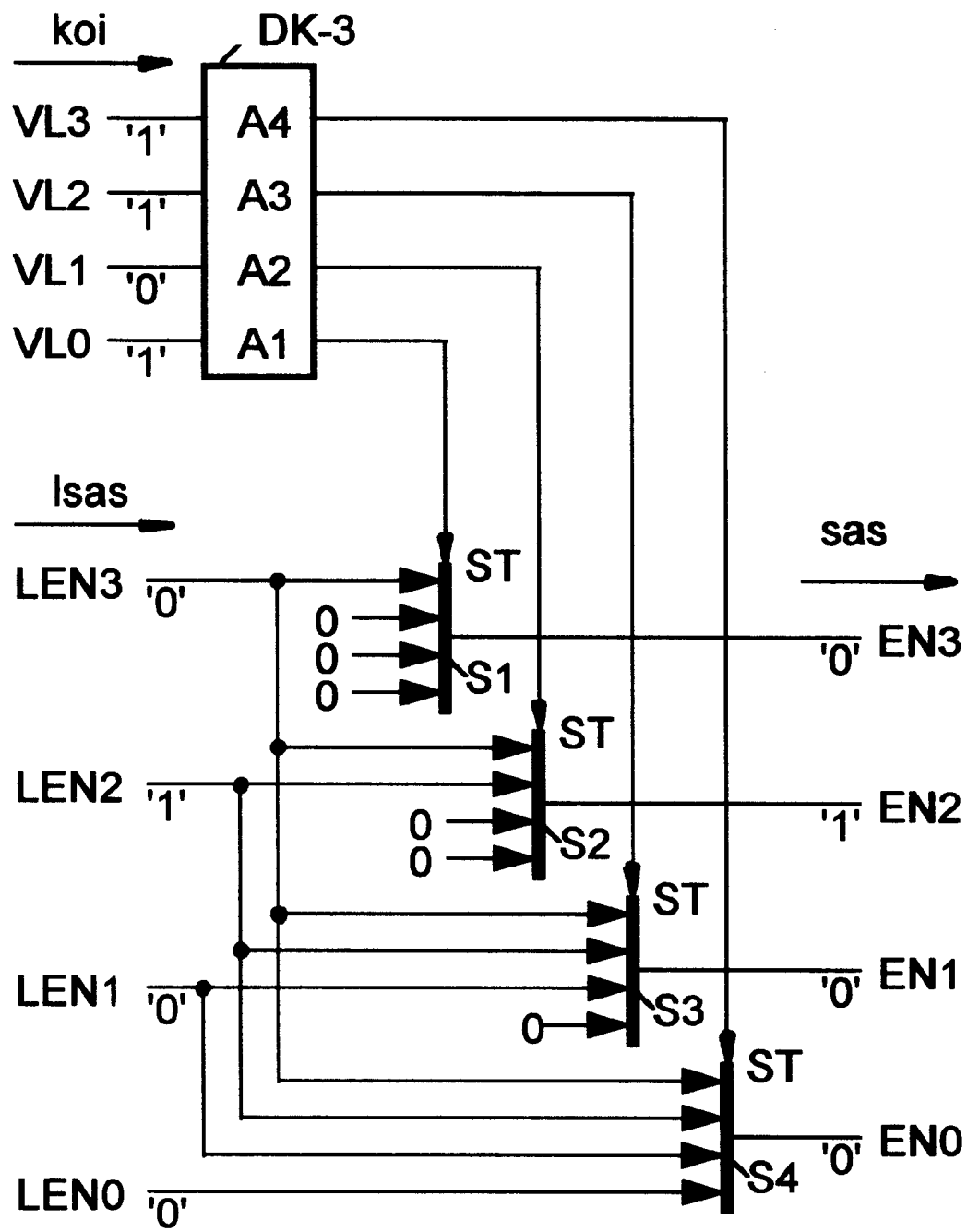

METHOD AND APPARATUS FOR CONVERTING MEMORY ADDRESSES INTO MEMORY SELECTION SIGNALS

BACKGROUND OF THE INVENTION

1. Field of the Invention

The present invention relates generally to the field of information storage devices, and, more particularly, the present invention relates to an improved system and method for allocating memory.

2. Description of the Related Art

In processor-controlled devices, a memory, whether dynamic or static RAMs (Random Access Memory) is provided for the storage of programming instructions and data. In order to write data to memory areas of the memory or read data from the individual memory areas, the processor generates a memory area address and passes it to a memory controller known as an SRAM or DRAM controller to those of ordinary skill in the art. The memory controller forwards this memory area address via address lines to address inputs of the memory. The memory area addresses generally represent a binary number, the smallest addressable memory area usually comprising one or more bytes.

The memory is formed by a plurality of insertion regions, into which in each case at least one memory module, usually an integrated memory chip, can be inserted. The insertion regions, which are typically plug-in devices, are frequently configured such that memory modules or memory chips having different storage capacities can be inserted. For example, memory modules with one or four Kbytes or Mbytes are typically used. Consequently, because of the various insertion regions, optimum matching of the storage capacity of the memory to the respective application is possible. This means that the memory modules must be inserted into the address-conforming insertion regions as a function of their storage capacity in order to ensure error-free memory addressing. Incorrect information regarding the storage capacity and the insertion regions leads to significant disturbances in the processor system and possibly to its failure.

SUMMARY OF THE PRESENT INVENTION

One object of the present invention is to ensure that memory addressing is suitable for the particular memory configuration, starting from the memory area address generated by the processor and taking into consideration the flexible configuration of the memory.

One aspect of the present invention is seen in the formation of conversion information items with the aid of which the memory area address generated by the processor are converted into memory selection signals which are coordinated with the current memory configuration. In this case, capacity information assigned to each inserted memory module and information indicating the storage capacity of the respective memory modules as well as configuration information indicating the presence of inserted memory modules of the insertion regions are provided as memory selection signals. Additionally, logical capacity information indicating the address space as a function of the acquired configuration information and logical configuration indicating the virtual configuration of the memory are derived from the acquired capacity information and configuration information. The logical capacity information represents, together with the configuration information, the conversion information.

In the case of an M-digit binary memory area address, n most significant digits are provided for the configuration of $2^n$ insertion regions, where it is possible to insert memory modules having a total storage capacity of $2^{m-n}$ into each insertion region. Capacity and configuration information is acquired for each insertion region. This division takes into consideration memory modules having $2^x$ storage capacity gradations. Other storage capacity gradations are possible but lead to addressing restrictions and to increased complexity for realization of the present invention.

According to a further aspect of the present invention, it is possible to insert memory modules having two different storage capacities, the larger storage capacity comprising $2^{m-n}$ addressable memory areas and the smaller storage capacity comprising $2^{m-n-k}$ (k, l, m, n=1, 2, ...) addressable memory areas. The memory modules having the larger storage capacity are located in the insertion region with the smallest assigned memory area addresses and are progressively inserted into the insertion regions with the next most significant assigned memory area addresses. The acquired capacity information is represented by binary capacity information indicating whether there is small or large storage capacity, and the configuration information is a binary representation which indicates the presence or the absence of an inserted memory module. Although this permits inaccurate population, it nevertheless reduces the storage capacity of incorrectly mounted memory modules. Furthermore, the restriction makes it possible to realize a conversion device even more simply and economically.

Yet another aspect of the present invention is the use of the conversion information for converting memory area addresses formed by the processor-controlled device into memory selection signals which are co-coordinated with the structure and storage capacity of the memory. The memory is formed by memory modules which have uniform and/or different storage capacities which are each inserted into a physical insertion region. An insertion region related logical memory selection signal is derived from n+k digits, where configuration of a currently present m-digit memory area address is accomplished with the aid of logical capacity information and logical configuration information which indicates the virtual memory configuration. Additionally, a physical memory selection signal is derived from the insertion region-related logical memory selection signal for the relevant insertion region.

Additional advantages and refinements of the method according to the present invention both for forming conversion information and for converting the memory area address into memory selection signals are set forth below.

BRIEF DESCRIPTION OF THE DRAWINGS

The present invention is set forth in more detail below with reference to the graphical illustration in which:

FIG. 7 illustrates a second shifting stage for forming physical memory selection signals.

DETAILED DESCRIPTION OF THE PRESENTLY PREFERRED EMBODIMENTS

Figure 1:
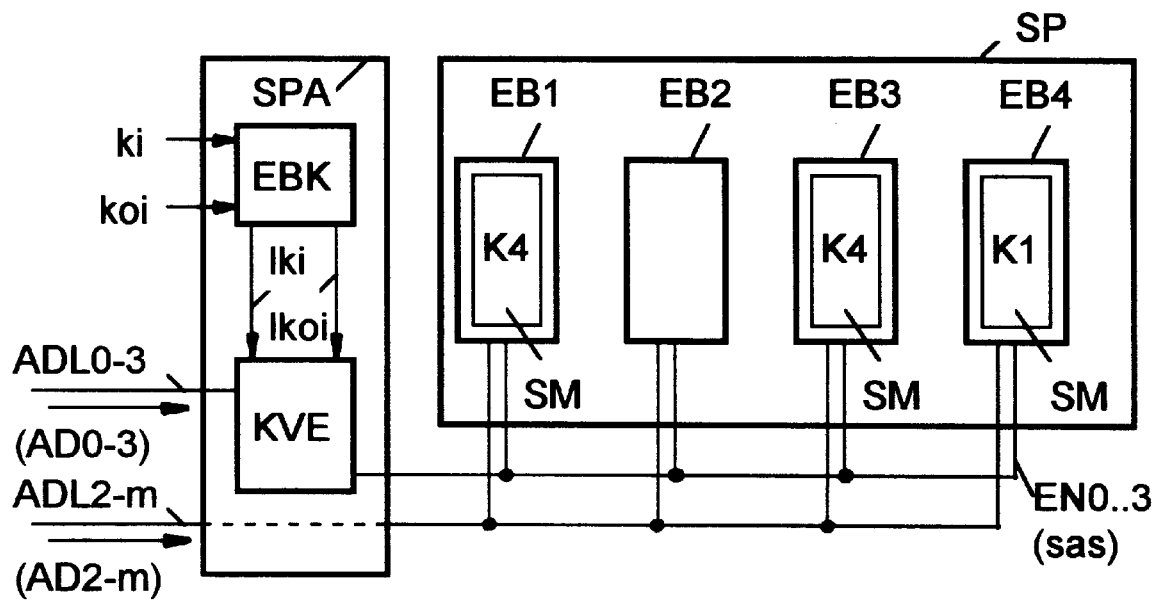
FIG. 1 illustrates a configuration of a memory with a conversion device according to the present invention.

FIG. 1 illustrates a first configuration of an exemplary embodiment of a memory SP which is formed by four insertion regions EB1 . . . 4 i.e. n=2. Memory modules SM having a predetermined storage capacity K1 or four times the predetermined storage capacity K4 can be inserted or plugged into each of these insertion regions. EB1 . . . 4, which are generally realized as plug-in locations, i.e. K=2. The predetermined storage capacity K1 being, for example, 1 Mbyte of the 24—i.e. M=24 address lines ADL required for addressing (n+k in the exemplary embodiment) 4 most significant address lines, AD0 . . . 3 which are passed to a conversion device KVE. The remaining n–m address lines ADL2 . . . m which are similarly passed and parallel to the insertion regions EB1 . . . 4 are passed directly to the memory SP. The conversion device KVE is connected via two lines which communicate logical capacity and logical configuration information LKO1 to a device EBK for forming conversion information. Coupled capacity and configuration information KI, KOI are also acquired there.

The conversion device KVE and the device EBK for forming configuration information each constitute a separate unit or a subunit of the memory controller SPA whose further functions (not illustrated) correspond to the DRAM or SRAM controllers. For the exemplary embodiment, it will furthermore be determined that first the memory modules SM having the larger and then having the smaller storage capacity K4, 1 are to be inserted into the insertion regions EB1 . . . 4, beginning with the first insertion region EB1. In the exemplary embodiment, the current configuration which is coordinated with an application is determined by a memory module SM having the large storage capacity K4 inserted in the first and third insertion regions EB1, 3 and by a memory module SM having the small storage capacity K1 inserted into the fourth insertion region EB4. No memory module SM is inserted into the second insertion region EB2.

Figure 2:
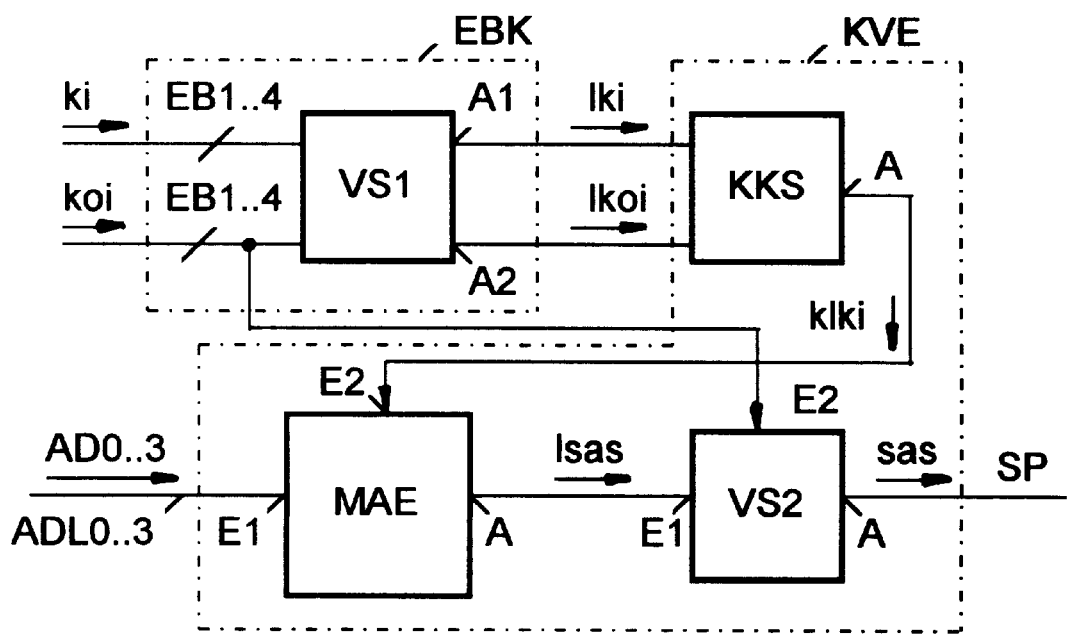
FIG. 2 is a block diagram illustration of the conversion device of FIG. 1.

FIG. 2 illustrates the device EBK for forming conversion information having a first shifting stage VS1, to which is passed the capacity information KI that indicates the storage capacity K1, 4 and the configuration information (koi) which indicates the presence of memory modules (SM) inserted into the respective insertion regions EB1 . . . 4. Logical capacity information LKI which has been determined is communicated via a first output A1 of the first shifting stage VS1 and logical configuration information Ikoi via a second input A2 to a capacity correction stage KKS arranged in a conversion device KVE.

The corrected capacity information items kiki pass via an output A of the capacity correction stage KKS to a second input E2 of a module selection unit MAE. This unit is similarly arranged in the conversion device KVE and has a first input E1 which receives the N address lines AD0, 1 by means of which the memory modules SM inserted into insertion regions EB1 . . . 4 are addressed. In the exemplary embodiment, the four most significant address lines ADL0 . . . 3 are passed to the module selection unit MAE. The logical memory selection signals Is as formed in the module selection unit MAE pass via an output A of the latter to a first input E1 of a second shifting stage VS2 which is similarly arranged in the conversion device KVE and at whose output A the memory selection signal sas is present. This allows the respective relevant insertion region EB1 . . . 4 to be addressed as a function of the currently present memory area address AD0 . . . M.

Figure 3:
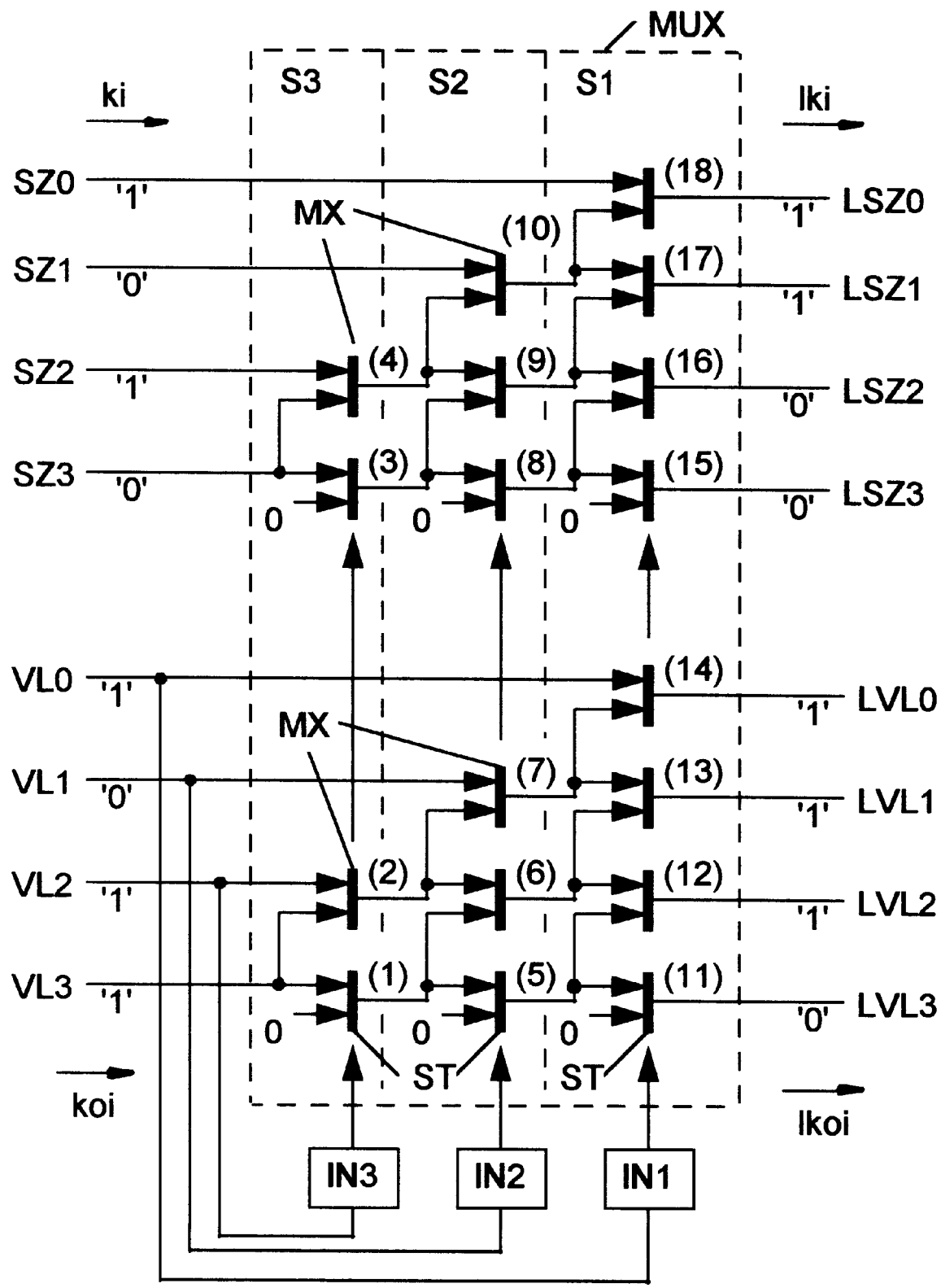
FIG. 3 illustrates the first shifting stage for forming the logical capacity and configuration items.

FIG. 3 is a block diagram illustration of the first shifting stage VS1 for capacity information ki, which in each case indicate the small or large storage capacity K1, 4 for each insertion region EN1 . . . 4. This is passed to a multiplexer MUX via four capacity lines SZ0 . . . 3 and four configuration information items koi, which indicate the presence of memory modules SM in the insertion regions EB1 . . . 4. These are passed to the multiplexer MUX via four presence lines VL0 . . . 3. The multiplexer MUX has three shift stages S1 . . . 3. The third shift stage S3 contains two times two (1 . . . 4) multiplex elements MX. The second shift stage S2 in each case contains 3 (5 . . . 10) multiplex elements MX and the first shift stage in each case contains four (11 . . . 18) multiplex elements MX. In each case, half of the multiplex elements MX are assigned to the capacity lines SZ0 . . . 3 and the other half are assigned to the presence lines VL0 . . . 3. A multiplex element MX has two inputs indicated by arrows, one output and a control input indicated by the designation ST. When a binary 0 is applied to the control input ST, the signals present at the upper input are switched to the output and when a binary 1 signal is applied to the control output ST, the signals present at the lower input are switched to the output.

In the third shift stage S3, the fourth presence line VL3 is connected respectively to one input of the first multiplex element MX (1), the second input of which is connected to 0 potential, and to one input of a second multiplex element MX(2), the second input of which is connected to the third presence line VL2.

In the third shift stage S3, additionally, the fourth capacity line SZ3 is connected to a third multiplex element MX (3), the second input of which is connected to 0 potential and to a fourth multiplex element MX (4). The second input is connected to the third capacity line SZ2. In the second shift stage S2, the output of the first multiplex element MX (1) is connected to the upper input of the fifth and to the lower input of the sixth multiplex element MX(5,6). Zero potential is connected to the lower input of the fifth multiplex element MX (5). The output of the second multiplex element MX (2) is connected to the upper input of the sixth and to the lower input of the seventh multiplex element MX (6,7). The upper input of this is connected to the second presence line VL1. The inputs of the eighth to tenth multiplex elements MX (8 . . . 10) are connected to the outputs of the third and fourth multiplex elements MX (3, 4) in the same way as described above.

In the third shift stage S3, the output of the fifth multiplex element MX (5) is connected to the upper input of the eleventh and to the lower input of the twelfth multiplex element MX (11, 12). The lower input of the eleventh multiplex element MX (11) is connected to zero potential. The output of the sixth multiplex element MX (6) is passed to the upper input of the twelfth and to the lower input of the thirteenth multiplex element MX (12, 13), and the output of the seventh multiplex element MX (7) is passed to the upper input of the thirteenth and to the lower input of the fourteenth multiplex element MX (13, 14). The upper input of the fourteenth multiplex element MX (14) is connected to the first presence line VL0. In a similar manner, the outputs of the eighth to tenth multiplex elements MX (8 . . . 10) and the first capacity line SZ0 are connected to the upper and lower inputs of the fifteenth to eighteenth multiplex elements MX (15 . . . 18).

An inverter IN1 is connected to the first presence line VL0, and the output of this inverter is connected to all the control inputs ST of the multiplex elements MX (11 . . . 18) in the first shift stage S1. Similarly, the control inputs ST of the second shift stage S2 are connected via a second inverter IN2 to the second presence line VL1 and the control inputs ST of the third shift stage S3 are connected via a third inverter IN3 to the third presence line VL3.

The outputs of the fourteenth to eleventh multiplex elements MX (14 . . . 11) represent the logical presence lines LVL0 . . . 3 on which the logical configuration information items Ikoi are available. The outputs of the eighteenth to fifteenth multiplex elements MX (18 . . . 15) represent the logical capacity lines LSZ0 . . . 3, on which the logical capacity information items Iki are present.

In the exemplary embodiment, when the capacity information Ki is a binary 1, it represents a storage capacity of 4 Mbytes and a 0 level represents a storage capacity of 1 Mbyte. During operation of the exemplary embodiment, a 1 signal level is found on the first capacity line SZ0, a zero signal level is on the second capacity line SZ1, and a one signal level is present on the third capacity line SZ2 and a zero level is present on the fourth capacity line SZ4. Additionally, configuration information koi having a zero level indicates the absence and a 1 signal level indicates the presence of an inserted memory module SM. Referring to the exemplary embodiment, a one signal level is present on the first presence line VL0, a binary zero signal level is present on the second presence line VL1, and a binary signal level one is present on the third presence line VL2 and a binary one signal level is present on the fourth presence line VL3. This means that in the second shift stage S2, information that is present is shifted in the less significant direction, since no memory module SM is inserted or plugged into the second insertion region EB2.

Consequently, logical capacity information Iki formed of binary information is present on the logical capacity lines LSZ (0 . . . 3) in a binary 1100 bit combination. The logical configuration information Ikoi is similarly present in binary form on the logical presence lines LVL0 . . . 3 in a binary 1100 bit combination.

Figure 4:
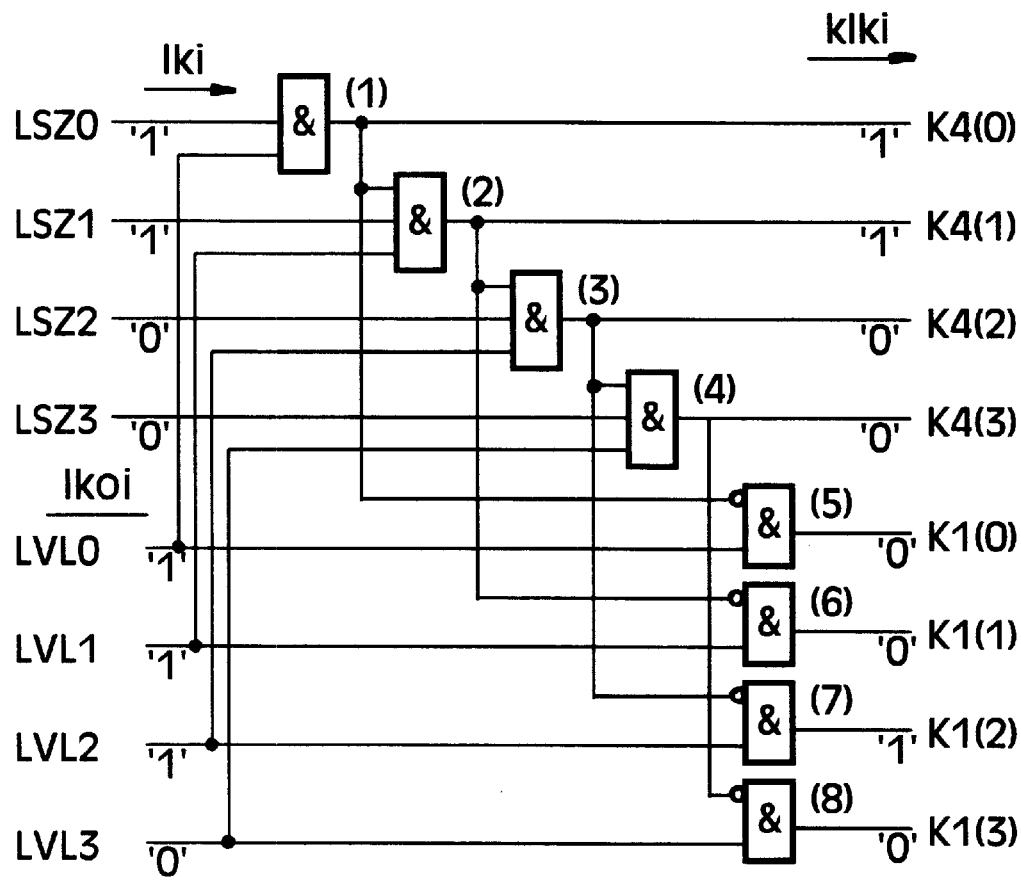
FIG. 4 illustrates a capacity correction stage for forming correction information items.

FIG. 4 is a block diagram illustration of the capacity correction stage KKS. In this diagram, each of the logical capacity lines LSZ0 . . . 3 is connected to a first to fourth AND gate & (1 . . . 4). The four logical presence lines LV0 . . . 3 are respectively connected to a further input of the first to fourth AND gates & (1 . . . 4) and respectively connected to an input to a fifth to eighth AND gate & (5 . . . 8). The output of the first AND gate & (1) is passed to a further input of the second and to a further inverting input of the fifth AND gate & (2 . . . 5). The output of the second AND gate & (2) is connected to a further input of the third and to a further inverting input of the sixth AND gate & (3, 6).

Similarly, the output of the third AND gate & (3) is connected to a further input of the fourth and to a further inverting input of the seventh AND gate & (4, 7). The output of the fourth AND gate & (4) is passed to a further inverting input of the eighth AND gate & (8). The four outputs K4 (0 . . . 3) of the four AND gates & (1 . . . 4) constitute capacity lines on which logical capacity information klki referring to the large storage capacity K4 are idicated. These capacity lines are subsequently designated as K4 lines. The outputs of the fifth to eighth AND gates & (5 . . . 8) represent the capacity lines K1 (0 . . . 3) which refer to the small storage capacity K1 and on which logical capacity information klki referring to the small storage capacity are present.

The information present at the eight outputs of the eight AND gates & (1 . . . 8) usually represent the corrected logical capacity information klki. Only the logical capacity information klki referring to large memory are required in the exemplary embodiment. In reference to the exemplary embodiment, a binary 1100 bit combination is present on the K4 lines (0 . . . 3). In this correction stage KKS, correction is affected to the extent that with reference to the population conditions, insertion of memory modules SM beginning with the addresses of the most significant insertion region EB1 . . . 4 erroneous population is corrected.

If, for example, a memory module SM having low storage capacity K1 is inserted into the second insertion region EB2, then inserted memory modules SM only having a low storage capacity K1 are taken into account for the third and fourth insertion regions EB 3, 4. Although memory modules SM having large storage capacity K4 may possibly be inserted. This provides storage capacity correction from actual to logically present storage capacity K1, 4.

Figure 6:
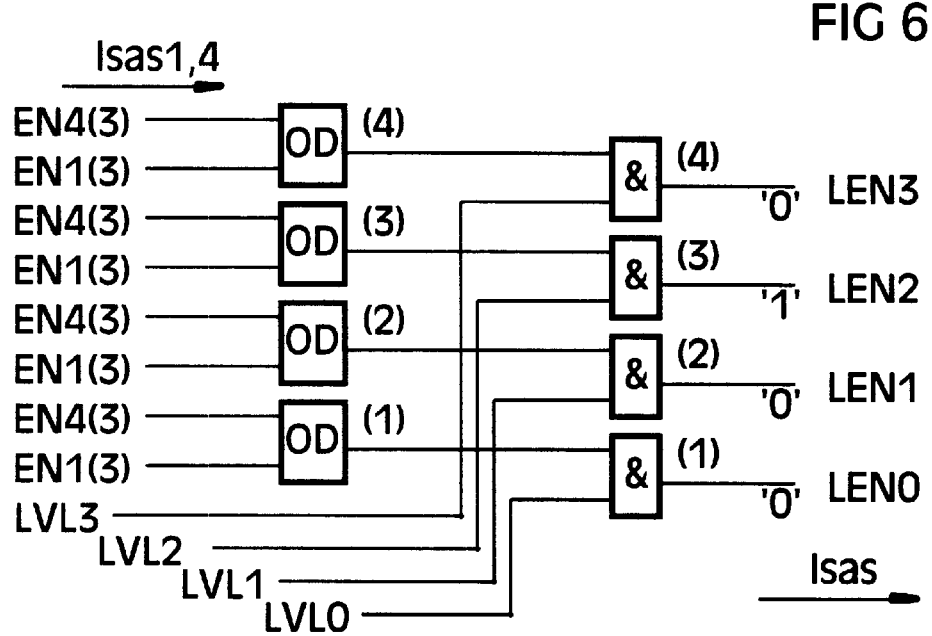
FIG. 6 illustrates a module selection unit.
Figure 5:
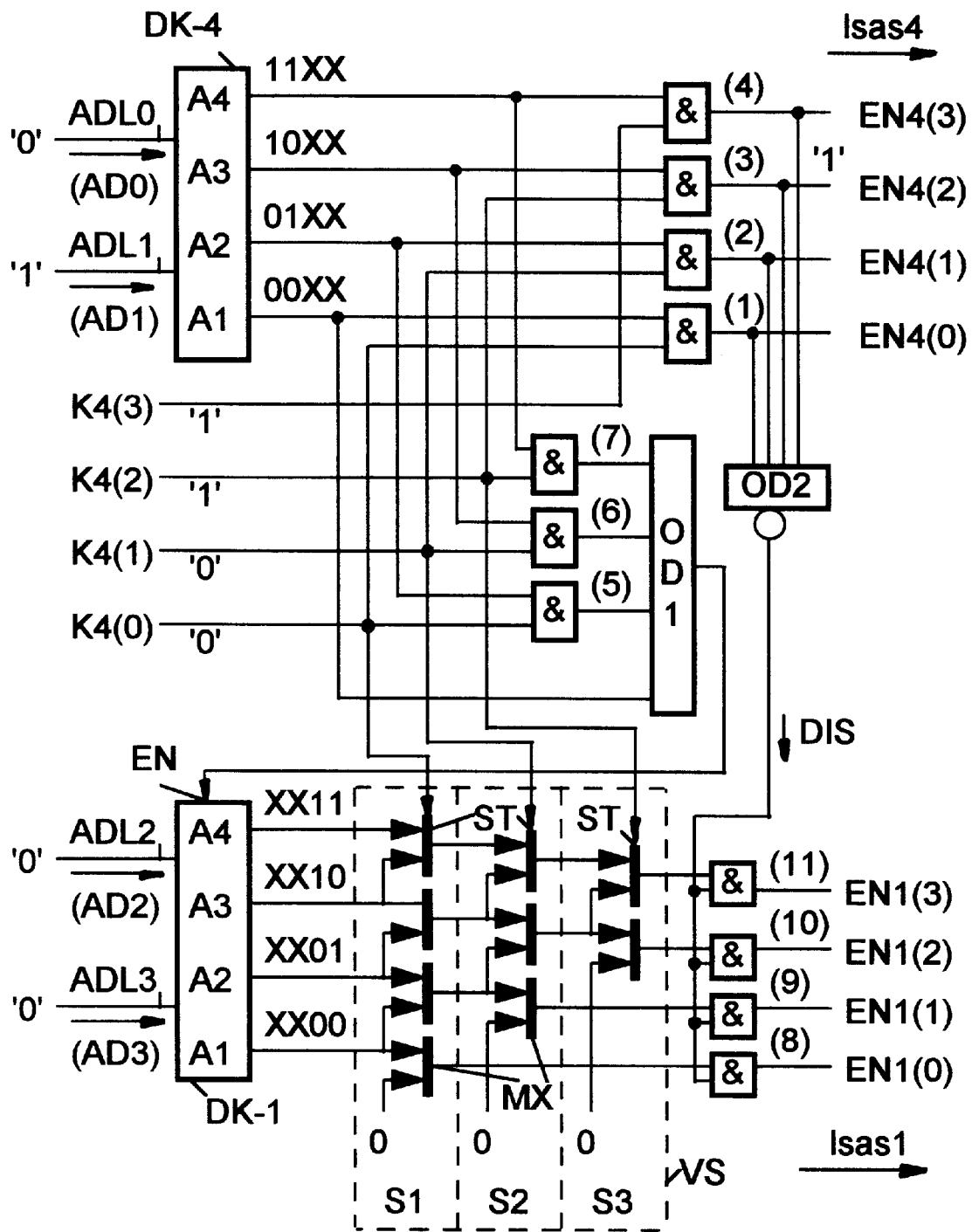
FIG. 5 is a block diagram illustration of a module selection unit for forming logical memory selection signals.

The components illustrated in FIG. 5 and FIG. 6 together show the module selection unit MAE of FIG. 2. In FIG. 5, the two least significant address lines ADL2, 3 of the n+k most significant address lines ADL0–3 are passed to a first decoding unit DK-1 and the two more significant address lines ADL0,1 are passed to a second decoding unit DK-4. In these decoding units DK-1, DK-4, the two address lines ADL0, ADL2, 3 are in each case decoded on four output lines A1 . . . 4 respectively assigned to an insertion region EB1 . . . 4. This means that one of the output lines AL1 . . . 4 is actively connected. That is to say that it has a binary one signal level in accordance with the binary address information AD0 . . . 3. Binary zero or one signal levels are present on the address lines ADL1, ADL2, 3.

The output lines A1 . . . 4 of the second encoding unit DK-4 are respectively connected to one input of four AND gates (1 . . . 4). The second to fourth output lines A2 . . . 4 are additionally respectively connected to the one input of fifth to seventh AND gates & (5 . . . 7). The four output lines A1 . . . 4 of the first decoding unit DK-1 are passed to a first shift stage S1 and in this case are connected in each case to one input of two multiplex elements MX. The remaining free input of the fourth multiplex element MX is coupled to zero potential. The output of the least significant multiplex element MX is connected to an input of a eighth AND gate & (8) and the outputs of the three further multiplex elements MX are connected to in each case one input of multiplex elements MX of a second shift stage S2.

The output of the least significant multiplex element MX is passed to a ninth AND gate & (9) and the outputs of the two remaining multiplex elements MX are in each case guided to one input of two further multiplex elements MX, which form a third shift stage S3. The output of the least significant multiplex element MX is connected to the input of a tenth AND gate & (10) and the output of the remaining multiplex element MX is connected to an input of an eleventh AND gate & (11).

An additional input of the fourth AND gate & (4) is connected to the fourth K4 line K4 (3) line and a further input of the third AND gate & (3) is connected to the further input of the seventh AND gate & (7), the third K4 line K4 (2) and to the control input ST of the third shift stage S3. Similarly a further input of the second AND gate & (2) is passed to a further input of the sixth AND gate & (6), to the second K4 line K4(1) and to the further control input ST of the second shift stage S2. A further input of the first AND gate & (1) has a connection to a further input of the fifth AND gate & (5), the first K4 line K4(0) and a control input ST of the first shift stage S1. Furthermore, the outputs of the fifth to seventh AND gates & (5 . . . 7) are combined in a first OR gate OD1. The output of this OR gate is connected to an enable input EN of the first decoding unit DK-1.

The outputs of the first to fourth AND gates & (1 . . . 4) are coupled to a second OR gate OD2, the inverting output of which are connected to in each case one further input of the eighth through eleventh AND gates & (8 . . . 11).

At the outputs EN4 (0 . . . 3) of the four AND gates & (1 . . . 4), binary information is present which indicates whether, for the address information items AD0,1 currently appearing on the address lines ADL 0,1, a memory module SM having the capacity K4 is available at one of the four insertion regions EB1 . . . 4. At the outputs EN1 (0 . . . 3) of the eighth to eleventh AND gates & (8 . . . 11), logical information is similarly present regarding whether, for the address information items AD2, 3 currently present on the address lines ADL2,3, a memory module SM having low capacity K1 is available at one of the four insertion regions EP1 . . . 4.

FIG. 6 illustrates four OR gates OD (1 . . . 4), to one input of which the respective output EN4 (0 . . . 3) of the first through fourth AND gates & (1 . . . 4), see FIG. 5, is passed and also to the further input of which a respective output EN1 (0 . . . 3) of the eighth to eleventh AND gates & (8 . . . 11) is passed. The outputs of the four OR gates OD1 (1 . . . 4) are respectively connected to one input of the four AND gates & (1 . . . 4). One of the four logical presence lines LVL (0 . . . 3) is respectively passed to the further inputs of the four AND gates & (1 . . . 4). The logical memory selection signal Isas is now present at the outputs LEN 0 . . . 3 of the four AND gates & (1 . . . 4). This logical memory selection signal Isas indicates in binary form which insertion region EB1 . . . 4 is to be logically selected.

The conversion of the logical memory selection signal Isas into the physical memory selection signal sas is illustrated in FIG. 7. For this purpose, the four presence lines VL0 . . . 3—see FIG. 3—are passed to a third decoding unit DK-3. The four outputs A1 . . . A4 of the third decoding unit DK3 are respectively connected to a control input ST of four shift stages S1 . . . 4.

The outputs LEN 0 . . . 3 of the four AND gates & (1 . . . 4)—See FIG. 6—are connected as follows to the four shift stages S1 . . . 4:

output LEN 0 to one input of the fourth shift stage S4 output LEN 1 to one input of the fourth and third shift stages S3, S4 the output LEN 2 to one input of the second, third and fourth shift stages S2 . . . 4 and LEN 3 to in each case one input of all four shift stages S1 . . . 4.

The remaining inputs of the respective four inputs of the four shift stages S1 . . . 4 are connected to a zero signal level.

The shift stages S1 . . . 4 are realized in the same way as illustrated in FIGS. 3 or 5. A decoding table (not illustrated) is stored in the third decoding unit DK-3 and is used to drive the shift stages S1 . . . 4 in such a way that the memory selection signal sas is present in binary form at the four outputs EN0 . . . 3 of the four shift stages S1 . . . 4. In each case one output EN 0 . . . 3 is connected separately to an insertion region EB1 . . . 4. This means that one of the four outputs EN0 . . . 3 has a binary one signal level by means of which the memory module SM inserted into the relevant insertion region EB1 . . . 4 is selected or enabled. Together with the address information items AD2–$m$ of the remaining address lines ADL 2–$m$, the sub-memory area in the enabled memory module SM is selected and data communicated from the microprocessor MP are stored or data are read and communicated to the microprocessor MP. Referring to the exemplary embodiment, the memory module SM inserted in the third insertion region EB3 is enabled or addressed.

The present invention is subject to many variations, modifications and changes in detail. It is intended that all matter described throughout the specification and shown in the accompanying drawings be considered illustrative only. Accordingly, it is intended that the invention be limited only by the spirit and scope of the appended claims.

We claim as our invention:

1. A method for converting memory area addresses of a processor-controlled device into memory selection signals corresponding to a structure and storage capacity of a memory having m digit binary memory area addresses and $2^n$ insertion regions, comprising the steps of:

inserting first and second memory modules having corresponding first and second storage capacities totaling $2^{m-n}$ into at least one physical insertion region of a memory;

generating capacity information identifying a storage capacity of the memory modules;

generating configuration information identifying the presence of memory modules;

deriving logical configuration and logical capacity information from the capacity and configuration information; and generating a memory selection signal based on the logical configuration and logical capacity information.

2. The method according to claim 1, wherein the memory is comprised of an m-digit binary memory area address and n most significant digits are provided for configuration of $2^n$ insertion regions.

3. The method according to claim 1, wherein the first and second memory modules have different storage capacities.

4. The method according to claim 3, wherein the step of deriving logical capacity information and logical configuration information comprises adding binary capacity information to provide a binary total which indicates a usable address space of the memory by the binary sum of storage capacities.

5. The method according to claim 4, wherein the step of deriving the logical capacity information and logical configuration information comprises shifting binary capacity information and binary configuration information.

6. A system for converting memory area addresses of a process-controlled device into memory selection signals correlated to a structure and storage capacity of the memory comprising:

a memory having at least first and second memory modules having a total storage capacity of $2^{m-n}$ located in an insertion region of the memory;

means for generating capacity information and configuration information based on the presence and capacity of memory modules connected to the memory;

means for deriving logical capacity information and logical configuration information from the capacity and configuration information; and means for generating memory selection signals based on the logical capacity and logical configuration information.

7. A method for converting memory area addresses in a processor-controlled device into memory selection signals corresponding to a structure and capacity of a memory comprising the steps of:

inserting first and second memory modules having a total storage capacity of $2^{m-n}$ into at least one insertion region of a memory;

generating a logical memory selection signal based on logical capacity informed derived from capacity information identifying a storage capacity and logical configuration information derived from configuration information indicating a virtual memory configuration; and generating a physical memory selection signal from the logical memory selection signal.

8. The method of claim 7, wherein the logical capacity information includes one data entry corresponding to said total logical storage capacity.

9. The method of claim 7, wherein the step of generating a logical memory selection signal further comprises mapping logical memory selection signals into logical configuration information.

10. The method of claim 7, wherein controlled logical memory selection signals represent a physical memory selection signal.

11. A system for converting memory area addresses in a processor-controlled device into memory selection signals comprising:

a memory further comprised of a plurality of memory modules having a total storage capacity of $2^{m-n}$ inserted into a physical insertion region of the memory;

a means for converting logical capacity information and logical configuration information into logical memory selection information, said logical configuration information and logical capacity information being derived from capacity and configuration of individual memory modules; and means for generating a physical memory selection signal from the logical memory selection signal.

* * * * *